(12) United States Patent
Bosch et al.

(10) Patent No.: US 10,904,240 B2
(45) Date of Patent: *Jan. 26, 2021

(54) SYSTEM AND METHOD OF VERIFYING NETWORK COMMUNICATION PATHS BETWEEN APPLICATIONS AND SERVICES

(71) Applicant: Cisco Technology, Inc., San Jose, CA (US)

(72) Inventors: Hendrikus G. P. Bosch, Aalsmeer (NL); Alessandro Duminuco, Milan (IT); Jeffrey Napper, Delft (NL); David Delano Ward, Somerset, WI (US); Syed Khalid Raza, Fremont, CA (US); Sape Jurrien Mullender, Amsterdam (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,652

(22) Filed: Dec. 6, 2019

(65) Prior Publication Data

US 2020/0145405 A1    May 7, 2020

Related U.S. Application Data

(63) Continuation of application No. 16/413,411, filed on May 15, 2019, now Pat. No. 10,511,590.

(Continued)

(51) Int. Cl.
*H04L 29/06* (2006.01)
*H04L 12/725* (2013.01)
*H04L 12/721* (2013.01)

(52) U.S. Cl.
CPC ........ *H04L 63/0815* (2013.01); *H04L 45/308* (2013.01); *H04L 45/38* (2013.01); *H04L 63/20* (2013.01)

(58) Field of Classification Search
CPC .................................................. H04L 63/0815
See application file for complete search history.

(56) References Cited

U.S. PATENT DOCUMENTS

| 2003/0088529 A1 | 5/2003 | Klinker et al. |
| 2015/0312142 A1 | 10/2015 | Barabash et al. |

(Continued)

FOREIGN PATENT DOCUMENTS

WO    WO 2013/134402 A1    9/2013

OTHER PUBLICATIONS

International Search Report and Written Opinion from the International Searching Authority, dated Dec. 5, 2019, 11 pages, for corresponding International Patent Application No. PCT/US2019/055433.

(Continued)

*Primary Examiner* — Simon P Kanaan
(74) *Attorney, Agent, or Firm* — Polsinelli PC (57) ABSTRACT

Disclosed are concepts for provided for managing application traffic. A method includes receiving a request to access a service from an application, confirming an entity of a user of the application and, based on the confirmation, generating, via an authentication service, a routing policy for data flows between the application and the service. The routing policy defines a mandated path between the application and the service. The method also can include storing proof-of-transit data in the traffic flow for tracking an actual path from the application to the service and determining whether the data path complies with the mandated path defined in the policy. When the determination indicates that the actual path followed the mandated path defined in the routing policy, the method includes granting access to the user for the service. When the actual path differs from the mandated path, the method includes denying access to the user.

20 Claims, 6 Drawing Sheets

Related U.S. Application Data

(60) Provisional application No. 62/749,226, filed on Oct. 23, 2018.

(56) References Cited

U.S. PATENT DOCUMENTS

| | | |
|---|---|---|
| 2016/0234234 A1 | 8/2016 | McGrew et al. |
| 2017/0111209 A1 | 4/2017 | Ward et al. |

OTHER PUBLICATIONS

Brockners, Frank, et al., "Service Chain Verification," Devnet-1084, Feb. 15, 2016, 59 pages.

SYSTEM AND METHOD OF VERIFYING NETWORK COMMUNICATION PATHS BETWEEN APPLICATIONS AND SERVICES

CROSS-REFERENCE TO RELATED APPLICATIONS

This application is a Continuation of, and claims priority to U.S. patent application Ser. No. 16/413,411 entitled SYSTEM AND METHOD OF VERIFYING NETWORK COMMUNICATION PATHS BETWEEN APPLICATIONS AND SERVICES filed on May 15, 2019, which claims the benefit of priority to U.S. Provisional Application No. 62/749,226, filed on Oct. 23, 2018, the contents of each of which are incorporated herein by reference in its entirety.

TECHNICAL FIELD

The present technology pertains to managing application network traffic by embedding proof-of-transit data within a data flow to evaluate whether the data flow followed a mandated data path according to a policy implemented via a single-sign-on or other authentication entity.

BACKGROUND

Software Defined Wide Area Networking (SD-WAN) is a trending feature in enterprise networking today. In this new generation of WAN technology, SD-WAN enables connections across networks such as broadband internet and cellular technologies (4G, LTE, etc.). SD-WAN utilizes the internet or cloud-native private network, decouples the network from the management plane and detaches the traffic management and monitoring functions from hardware. There are several basic components to an SD-WAN context. SD-WAN utilizes edge connectivity abstraction, WAN virtualization, policy-driven, centralized management and elastic traffic management. SD-WAN networks are becoming more prominent and one feature of these types of networks is that they can be used to craft paths for data from a client to a (web) service. The paths that are created can ensure that the data path passes through proper networks and is secure.

To establish secure communication channels today and to get access to resources managed by (cloud) services, (web) credentials are carried in web-cookies or OAuth tokens (generally, web credentials) and act as cryptographic capabilities for those resources. A (web) application first obtains (web) credentials from a single-sign-on (SSO) service's identity provider or other authentication provider, (possibly with multi-factor authentication), and the applications provide these (web) credentials as proof of identity to get access to the resource managed by the (web) service. Such credential exists in various forms and protocols (e.g., HTTP, OAuth, etc.) but invariably involves service redirections to a single-sign-on, OAuth or other authentication service to capture the credentials and include these in the application service session. The (web) credentials themselves minimally contain the identity of the caller, access rights, and if included, security assertion, e.g., possibly coded through Security Assertion Markup Language (SAML).

There are problems with the authentication service approach, specifically for enterprise networking. The current approach (a) relies only on end-to-end authentication and encryption to protect traffic on the public internet and (b) assumes an encrypted channel is secure while information can still be gleaned from it. The problem with (a) is that security officers in enterprises or regulatory requirements are likely to demand segregation of enterprise traffic regardless of the end-to-end encrypted channel. With regard to (b), when one relies on carrying individual flows, information can be gleaned from individuals even when these are encrypted, for instance by timing messaging, correlating packet sizes to known flows, and knowing both source and destination addresses of flows. To create a better secured channel, aggregation of flows is needed to obfuscate timing and individual packet sizes and to hide the destination IP addresses.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

There is a need in the art for a network approach for improving security in a network context. The improvement includes configuring a single-sign-on or other authentication entity to establish, according to a policy, a mandated route for packets moving from one device to another and an approach to tracking or identifying a proof-of-transit such that the destination device only accepts packets or enables access to the device if the proof-of-transit matches the mandated route for the packets according to the policy. Data can be positioned within the flow and nodes along the network path can confirm that the flow traversed a respective node. This is particularly important when alternate routes are provisioned so that traffic can be kept away from bad actors.

Disclosed are systems, methods, and non-transitory computer-readable storage media for using verified communication paths between applications and network-based services as a mechanism for confirming the viability of the user accessing the network-based services.

Overview

The approach to utilizing proof-of-transit data within a packet flow to determine whether an actual path confirmed to a mandated path from a single-sign-on entity can be implemented in a number of different ways.

In one aspect, the present disclosure implements an overlay or underlay network to include way-points and in-line services such that single-sign-on services can be used to encode a path in the Security Assertion Markup Language (SAML) statement of a cookie or token and that the system can verify that path when a packet flow arrives at a destination node. A basic point of this disclosure is that the system requires a (web) flow to follow a particular mandated network path and that the system has a means to verify the actual path at the destination server.

Once the system incorporates the above-described proof-of-transit, then the system can select specific network paths to keep a potential attack surface small. An attack surface defines all points where an attacker can insert or extract data from a networked system. Segmentation of traffic can be important in this scenario as such a feature helps force traffic across such segments and to reduce the attack surface.

Zero-Trust Networking (ZTN) and other similar approaches aim to remove any implied trust in the network used for connecting applications hosted on (mobile) devices to cloud or enterprise hosted services. Employees connecting to an enterprise network experience a false sense of security. Malware and other nefarious material can be present on (mobile) devices as the employee is interacting with enterprise (cloud) services. Moreover, mobile devices can be connected to an enterprise network and a public network at the same time, thereby introducing a risk of security breaches. It has been argued that enterprise networks are just as insecure as the public internet and instead enterprises should only rely on end-to-end security communication channels (e.g., Secure Sockets Layer (SSL) and/or Transport Layer Security (TLS)) between applications hosted on mobile devices when connecting to cloud or resident services.

ZTN and the like approaches such as BeyondCorp are extended in this disclosure with a series of techniques and methods that address the above-described deficiencies. First, security assertions are included in (web) credentials, e.g., coded in SAML, that assert the network path that needs to be taken for flows originating from a device application and terminating at (cloud) services. These assertions stipulate what way-points, in-line services and networks a flow needs to be routed through before it can be accepted by a (cloud) service. Second, network (overlay) routers, way points and services are enabled to sign TLS sessions transparently. Embedding or encoding data in the traffic flow (cookie or token or other structure) through network overlay components can provide a proof-of-transit to the service and enable more traditional enterprise IT functions to assert themselves even in ZTN/Beyondcorp systems. Evidence that the flow was actually routed through zero, one or more way-points, in-line services and networks is therefore found within the data. These way points can be used by enterprise IT organizations to install more traditional services such as firewalls, IDS, IPS and other enterprise IT functions to enable standard IT operations even when applications and services are deployed on the internet. Third, (cloud) services are enabled to accept or reject augmented (TLS-based) flows depending on discrepancies between the required network path by its way-points, in-line services and networks and the security assertions, thus forcing flows through those way-points, in-line services and networks to enforce enterprise IT operations.

One benefit realized with these innovations is that the single-sign-on or other authentication service becomes a network routing policy service and is used to enforce an enterprise's security policies for applications hosted on (mobile) devices that directly interact with (cloud-based) (web) services. Such security policies are likely dynamic and through the SSO services, changes are enforced without disrupting the employee's applications or the (cloud) services. The (web) credentials dispatched for each flow individually enforce its disposition through way-points, in-line services and networks. In other words, an enterprise can enforce how a (cloud) service is consumed by its employees even when the (mobile) device can potentially connect directly to the service over the internet. The security mechanism may be implemented with one or more of a virtual private network (VPN) client, a Software Defined-Wide Area Network (SD-WAN) overlay, an SSO or other authentication service and a cloud-based service. By routing enterprise traffic across an SD-WAN fabric, in conjunction with a VPN client, an enterprise making use of the service may dynamically control the routing of its employee's traffic.

Detailed Description

A brief introductory description of example systems and environments for executing the activities disclosed herein are first disclosed.

Figure 1A:
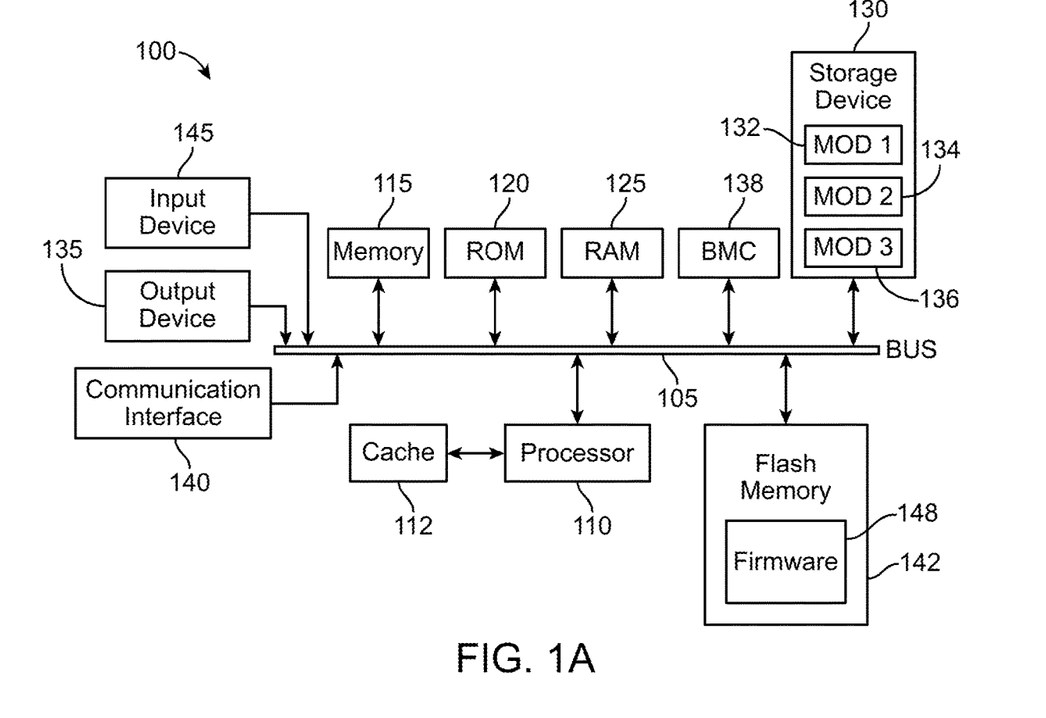
FIGS. 1A and 1B illustrates example system embodiments.
Figure 1B:
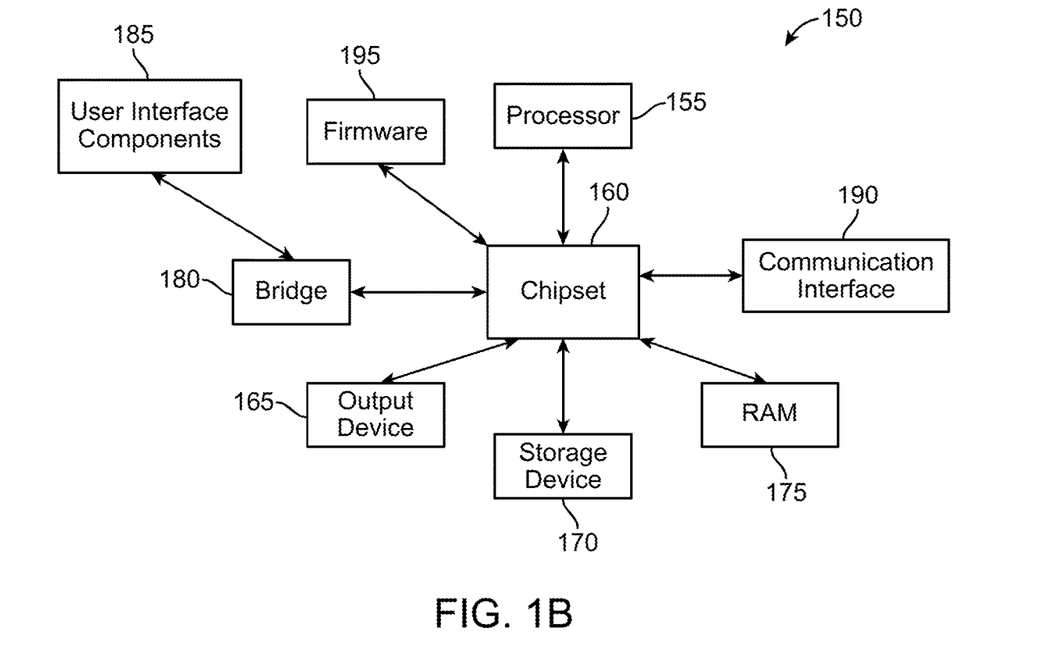

FIGS. 1A and 1B illustrate example system embodiments. The more appropriate embodiment will be apparent to those of ordinary skill in the art when practicing the present technology. Persons of ordinary skill in the art will also readily appreciate that other system embodiments are possible.

FIG. 1A illustrates a system bus computing system architecture 100 wherein the components of the system are in electrical communication with each other using a bus 105. Example system 100 includes a processing unit (CPU or processor) 110 and a system bus 105 that couples various system components including the system memory 115, such as read only memory (ROM) 120 and random access memory (RAM) 125, to the processor 110. The system 100 can include a cache 112 of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

The BMC (baseboard management controller) 138 can be a specialized microcontroller or processor on the system 100. In some cases, the BMC 138 can be part of an Intelligent Platform Management Interface (IPMI). Moreover, in some cases, the BMC 138 can be embedded on a motherboard or main circuit board of the system 100. The BMC 138 can manage the interface between system management software and platform hardware. Different types of sensors built into the system 100 can report to the BMC 138 on parameters such as temperature, cooling fan speeds, power status, operating system (OS) status, and so forth. The BMC 138 can monitor the sensors and send alerts to an administrator via a network interface, such as communication interface 140, if any of the parameters do not stay within preset limits or thresholds indicating a potential failure or error of the system 100. The administrator can also remotely communicate with the BMC 138 to take some corrective action, such as resetting or power cycling the system 100, to restore functionality.

Flash memory 142 can be an electronic non-volatile computer storage medium or chip which can be used by the system 100 for storage and/or data transfer. The flash memory 142 can be electrically erased and/or reprogrammed. Flash memory 142 can, for example, include erasable programmable read-only memory (EPROM), electrically erasable programmable read-only memory (EEPROM), ROM, NVRAM, or complementary metal-oxide semiconductor (CMOS). The flash memory 142 can store the firmware 148 executed by the system 100 when the system 100 is first powered on, along with a set of configurations specified for the firmware 148. The flash memory 142 can also store configurations used by the firmware 148.

The firmware 148 can include a Basic Input/Output System or its successors or equivalents, such as an Extensible Firmware Interface (EFI) or Unified Extensible Firmware Interface (UEFI). The firmware 148 can be loaded and executed as a sequence program each time the system 100 is started. The firmware 148 can recognize, initialize, and test hardware present in the system 100 based on the set of configurations. The firmware 148 can perform a self-test, such as a Power-on-Self-Test (POST), on the system 100. This self-test can test functionality of various hardware components such as hard disk drives, optical reading devices, cooling devices, memory modules, expansion cards and the like. The firmware 148 can address and allocate an area in the memory 115, ROM 120, RAM 125, and/or storage device 130, to store an operating system (OS). The firmware 148 can load a boot loader and/or OS, and give control of the system 100 to the OS.

The firmware 148 of the system 100 can include a firmware configuration that defines how the firmware 148 controls various hardware components in the system 100. The firmware configuration can determine the order in which the various hardware components in the system 100 are started. The firmware 148 can provide an interface, such as an UEFI, that allows a variety of different parameters to be set, which can be different from parameters in a firmware default configuration. For example, a user (e.g., an administrator) can use the firmware 148 to specify clock and bus speeds, define what peripherals are attached to the system 100, set monitoring of health (e.g., fan speeds and CPU temperature limits), and/or provide a variety of other parameters that affect overall performance and power usage of the system 100.

While firmware 148 is illustrated as being stored in the flash memory 142, one of ordinary skill in the art will readily recognize that the firmware 148 can be stored in other memory components, such as memory 115 or ROM 120. However, firmware 148 is illustrated as being stored in the flash memory 142 as a non-limiting example for explanation purposes.

FIG. 1B illustrates an example computer system 150 having a chipset architecture that can be used in executing the described method(s) or operations, and generating and displaying a graphical user interface (GUI). Computer system 150 can include computer hardware, software, and firmware that can be used to implement the disclosed technology. System 150 can include a processor 155, representative of any number of physically and/or logically distinct resources capable of executing software, firmware, and hardware configured to perform identified computations. Processor 155 can communicate with a chipset 160 that can control input to and output from processor 155. In this example, chipset 160 outputs information to output 165, such as a display, and can read and write information to storage device 170, which can include magnetic media, and solid state media, for example. Chipset 160 can also read data from and write data to RAM 175. A bridge 180 for interfacing with a variety of user interface components 185 can be provided for interfacing with chipset 160. Such user interface components 185 can include a keyboard, a microphone, touch detection and processing circuitry, a pointing device, such as a mouse, and so on. In general, inputs to system 150 can come from any of a variety of sources, machine generated and/or human generated.

Chipset 160 can also interface with one or more communication interfaces 190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 155 analyzing data stored in storage 170 or 175. Further, the machine can receive inputs from a user via user interface components 185 and execute appropriate functions, such as browsing functions by interpreting these inputs using processor 155.

Moreover, chipset 160 can also communicate with firmware 195, which can be executed by the computer system 150 when powering on. The firmware 195 can recognize, initialize, and test hardware present in the computer system 150 based on a set of firmware configurations. The firmware 195 can perform a self-test, such as a POST, on the system 150. The self-test can test functionality of the various hardware components 155-190. The firmware 195 can address and allocate an area in the memory 175 to store an OS. The firmware 195 can load a boot loader and/or OS, and give control of the system 150 to the OS. In some cases, the firmware 195 can communicate with the hardware components 155-190. Here, the firmware 195 can communicate with the hardware components 155 and 165-190 through the chipset 160 and/or through one or more other components. In some cases, the firmware 195 can communicate directly with the hardware components 155-190.

It can be appreciated that example systems 100 and 150 can have more than one processor 110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described herein.

Figure 2:
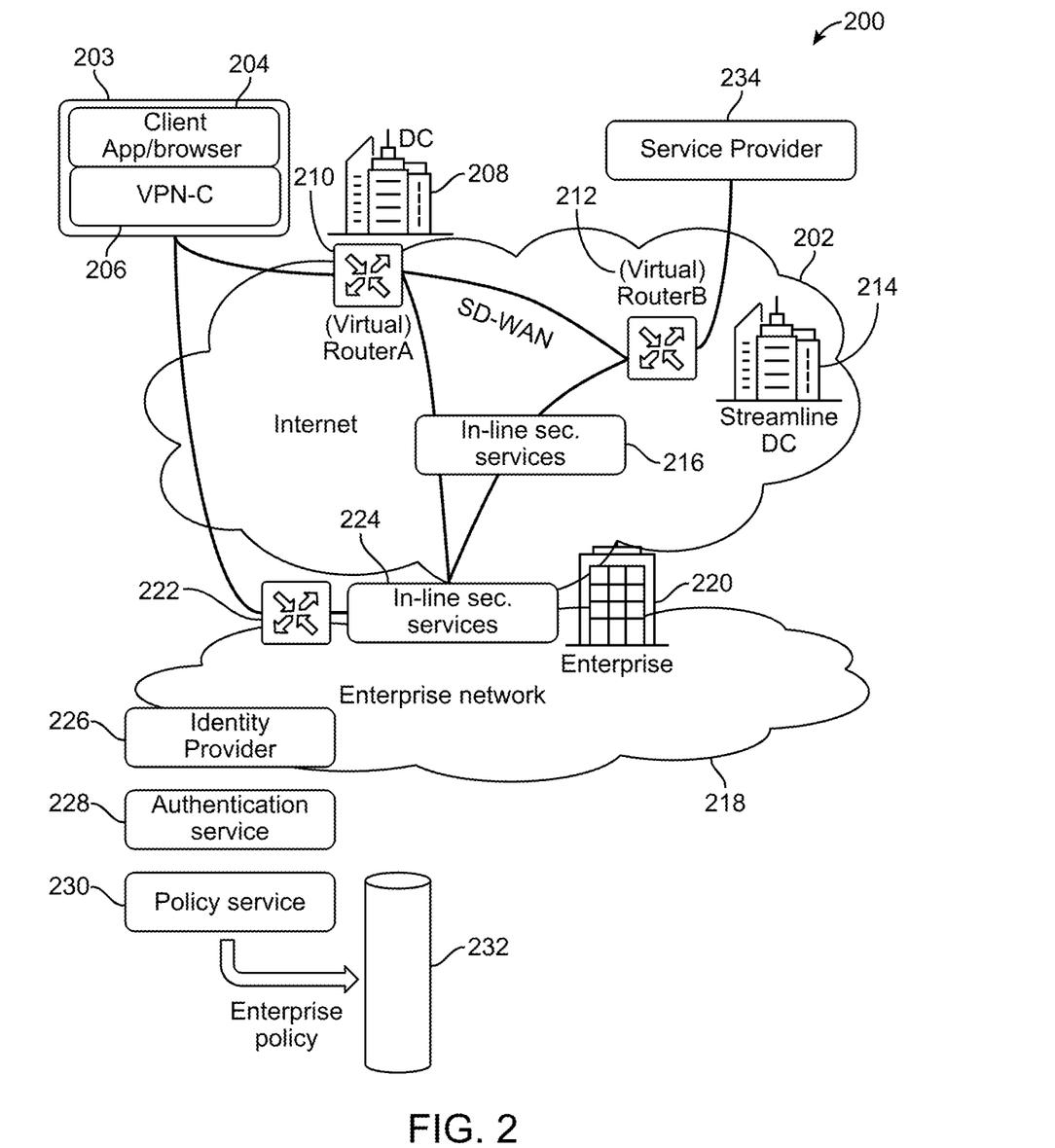
FIG. 2 illustrates a network environment in which the disclosed approach is applicable.

FIG. 2 illustrates a network within which the present principles can apply to provide verified network communication paths between applications and services. FIG. 2 shows the overall security architecture 200 and entities involved in the techniques presented herein. The following entities collaborate in offering the verified networking service.

A client 204 accesses a service provider 234 through a TLS-based HTTP (or other) connection. A VPN client (VPN-C) 206 hosted on the (mobile) device 203 provides access to the (overlay) network. The VPN client 206 may be, by way of example only, a Cisco AnyConnect™ application, or other VPN client application. One or more (virtual) routers (A and B) 210, 212, possibly implementing a SD-WAN or other routed network, provide connectivity to the (cloud) service 234. An identity provider 226 is responsible for providing (web) credentials, extended with security assertions (e.g., SAML (security assertion markup language) statements). An authentication service 228 authenticates, possibly by using multi-factor authentication, the enterprise's employee using a particular employee device. This may be provided, for example, by way of a DUO (two-factor authentication) service. A policy service 230 provides a policy 232 which describes routing approaches and disposition of flows originating from the (mobile) device 203. The policy service 230 can be or coordinate with a single-sign-on (SSO) or other authentication server/service operated by an entity that employs the user or can be any other entity that provides a mandated route for data flows from a device 203 to the cloud service. The SSO or other authentication service can be considered a routing policy engine. The system may indicate what SD-WAN VPNs to use per destination, may indicate what way-points and/or inline services and/or network routers to pass through to enforce on flows. A service provider 234 provides some type of service which can be a cloud service. The cloud service can be of any type and only generally needs to be accessed by the browser or application 204 on the client device 203. Data centers 208, 214 are also shown as being part of the overall architecture 200.

The methodology may be described by way of example. Consider an environment 200 having a service offering that includes a cloud service 234. A browser 204 on a mobile device is used to access the cloud service 234. A single-sign-on service including an identity provider 226, an authentication service 228 and a policy service 230 (which accesses a policy 232) is used to provide web credentials to the browser 204 for access. A VPN (virtual private network) client 206 is hosted on the mobile device and a SD-WAN (software-defined wide area network) represents a network overlay.

The example use case is that the browser 204 should navigate successfully to the web-service 234 to access a resource, use web-credentials from the single-sign-on service, such that the SD-WAN network and VPN client 206 are used to carry the corresponding HTTP flow between the browser 204 and the cloud service 234 passing through a mandated path of zero, one or more way-points, in-line services 216, 224 and/or routers 210, 222, 212. This is called a verified network flow path. The single-sign-on service can mandate a particular path for the communication which can then be verified through proof-of-transit data embedded or encoded within a Transmission Control Protocol (TCP) session and/or a header or any portion of the data flow. The destination web-service HTTP, accessed by the user agent (such as a browser), redirects the user agent to the SSO service for authenticating the identity of the user. A token or cookie is created as part of this authentication process. The sign-on process can be expanded such that the token or cookie associated with that sign-on is only valid if it passes through a mandated route to the cloud service. As a packet flow moves through the SD-WAN, through a service chain, for example, a packet that passes through a node or entity in the network can receive, from the respective node, a cryptographic signature using a private key associated with that node. There are many types of cryptographic or digital signatures that can be used, for example, ElGamal or DSA. That signature can be stored within the flow or in a separate database such that as the flow arrives at the cloud service, the cloud service will only accept the flow or grant access if the mandated path was taken by the flow, i.e., the corresponding signatures can be found. The cryptographic signatures along the path can be characterized as bread crumbs marking the path. These "crumbs" left by the nodes taken can be found within the flow itself in a TCP session or in a separate database. This can occur at each hop or at each node along a path through the network. The cookie which describes the mandated path or private keys associated with that path can be stored in an HTTP portion of the TLS session which cannot be modified or even read at the networking layer. In one aspect, the cookie or token can be stored or embedded in an HTTP component inside a TLS session. The cookie or token stores the keys necessary for the cloud service to decode or access the proof-of-transit data. The TCP flow itself can include the "crumbs" or proof-of-transit or such "crumbs" can be stored in an external database for later verification. The cloud service can correlate data from the cookie and obtain the necessary keys to verify the flow or pull the "crumbs" from the external database and verify the network path.

In one aspect, a TLS session includes a record or a series of records that can be viewed by a service provider or a node in the network. One aspect of embedding a bread crumb or record-of-transit would be for a respective node along the path to insert a record into the TLS session for that data flow. The inserted record in the TLS session could provide proof-of-transit for the destination node of the actual data path and that it went through the proper nodes along the mandated path. These records are included in the TCP flow, requiring adjustment to the later TCP packets, but do not require the end-to-end TLS session to be decrypted. Instead, the TCP flow is used only as a mechanism to carry the records.

If the flow's actual path does not match the mandated path found in the cookie or token or stored in a database, then the cloud service can reject the flow as not being authentic.

The approach disclosed herein provides that the (web) credentials associated with the flow of data through the network must stipulate that, for the browser 204 to successfully interact with the resource 234 managed by the cloud service, the flow must be routed across the VPN client 206 and SD-WAN, or according to any mandated flow path. Then, as the flow finds its way to the cloud service 234, the cloud service 234 can be rejected or accepted based on the actual path taken by a flow. When the flow provably routes through the proper and mandated pre-selected way-points, in-line service and networks, the flow is accepted by the cloud service 234.

Example enterprise use cases for the enterprise service include the following. Assume an enterprise 220 operating an enterprise network 218 defines two classes of employees: "gold" and "bronze" class employees. "Gold" employees may be allowed for direct connectivity across the VPN client 206 and SD-WAN network to the (cloud) service 220, whereas a "bronze" user may have their traffic first inspected by a deep-packet inspection function, routed through a firewall and other traffic inspection function. On the other hand, another (cloud) service 234 may be reached by the VPN client 204 routing the traffic directly across the internet 202. When an employee requests web-credentials to access a service, the credentials only encode that the flow needs to be sent over the SD-WAN, whereas a "bronze" web-credential describes that the flow is only acceptable if the flow's TLS (transport layer security) session contains proof it has been handled by the in-line services 216, 224.

Figure 3A:
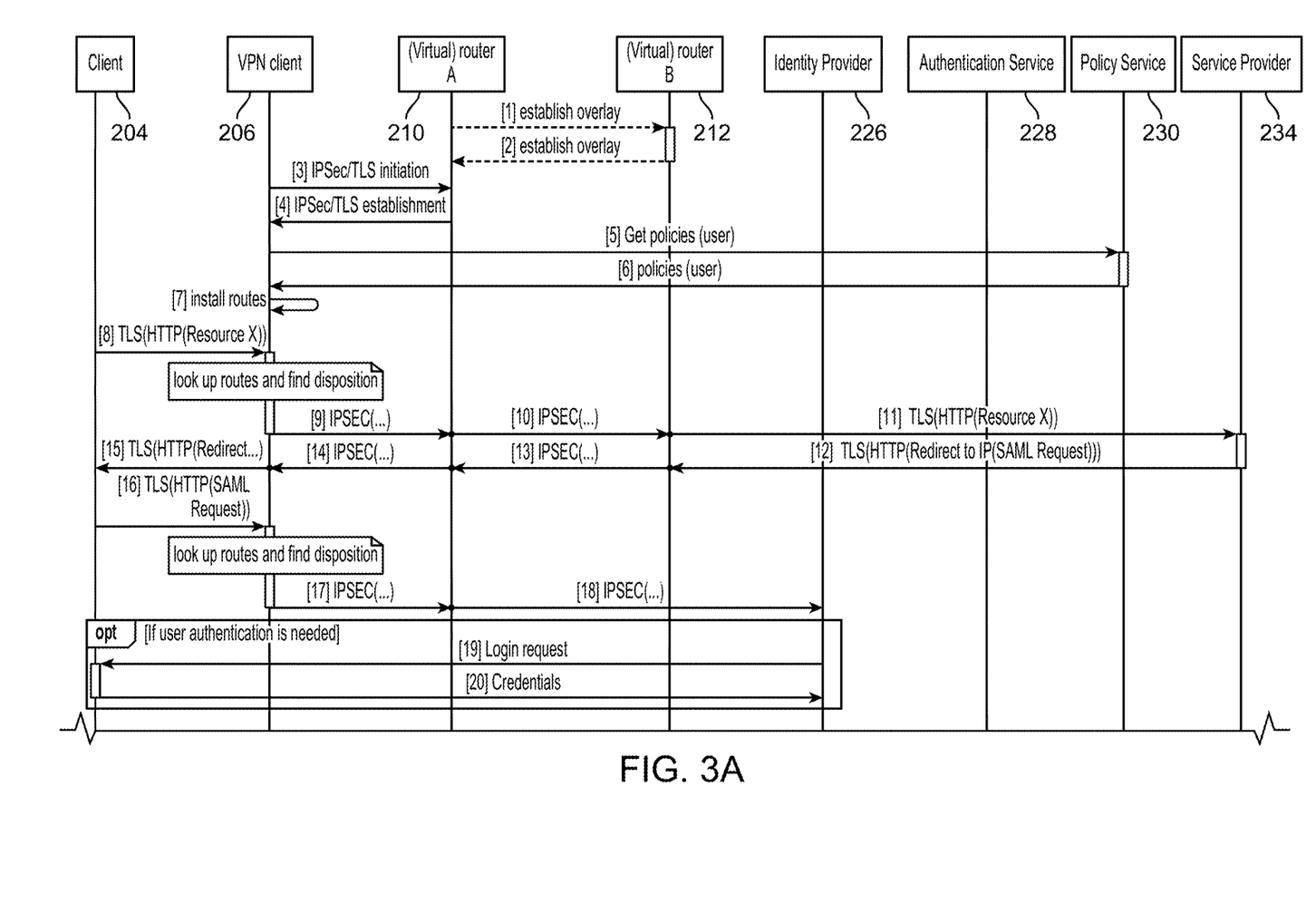
FIGS. 3A and 3B illustrate the signal processing between various components when applying the principles of this disclosure.
Figure 3B:
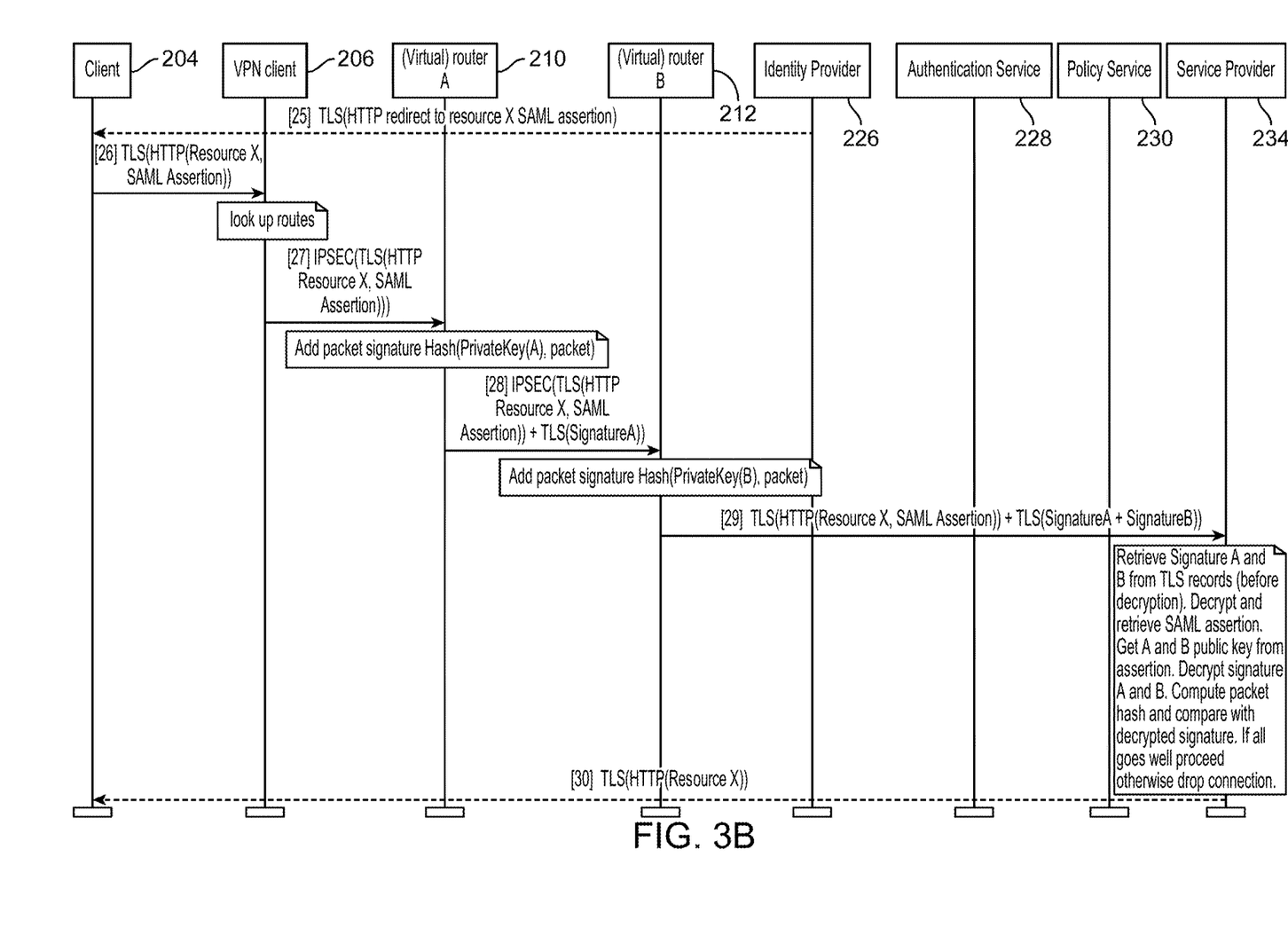

FIGS. 3A and 3B show a simplified call flow for establishing a verified network flow with all participants. This call flow is used as an example and alternate flows with alternate principles are equally possible.

This example described herein presents a method by which the service provider 234 can verify that the packets belonging to the communication flow between the client 204 and the service provider 234 have traversed the mandated route by passing through a set of (virtual) routers 210, 212. While the following refers to (virtual) routers, it should be understood that the same applies for in-line services and/or way-points. Any route through any combination of nodes within a network could apply.

One example method uses 4 main procedures: initialization, authorization, path signature, and path verification shown in FIGS. 3A and 3B. Initialization is discussed first. In messages [1]-[6], the (overlay) network is established, the (mobile) device's VPN client 206 connects to the overlay network and the VPN client 206 is informed on the disposition of flows. The use of a VPN client in this example is not mandatory for the disclosure. The path verification concepts are more generally applicable and do not require a VPN client per se for connectivity. The (virtual) routers 210, 212 use their own methods to establish the connectivity. For instance, a SD-WAN may use its own orchestration and route signaling procedures to establish network overlay connectivity based on IPsec tunnels. If the connecting network is established by way of standard (edge) routers, messages [1]-[2] represent the establishment of a routed network. As part of the establishment of the network, certificates and private keys are established at the (virtual) routers 210, 212. This means that each of the entities can sign traffic with their private key, which can be verified by applying the (virtual) router's certificate. The application of the SD-SWAN overlay is also not mandated as being required for the path verification concepts disclosed herein. Other network configurations can also be used to apply the broader principles disclosed herein.

Once the network has been established, the VPN client 206 can establish its connection to the (virtual) routers 210, 212 by providing something like an attachment circuit. The process is shown by messages [3] and [4]. The attachment circuit can be an IP Security (IPsec), TLS or other type of tunnel. In case connectivity to regular routers is supported, the attachment circuit can be any kind of attachment circuit as described in RFC4364, incorporated herein by reference. RFC4364 is a document that specifies internet standards related to a point-to-point protocol defining a standard method for transporting multi-protocol datagrams over point-to-point links. Since the VPN client 206 operates on behalf of an enterprise's employee, message [3] carries an employee identity with an (one-time) password or (web) credentials obtained through a single-sign-on procedure with or without multi-factor authentication. Like the (virtual) routers 210, 212, the VPN client 206 can be provided with a certificate and private key for flow signing.

Messages [5]-[6] pull routing policy or flow disposition from the enterprise's policy service 230. This contains a list of routes (e.g., by IP address or DNS name) and the appropriate disposition of flows per destination. For instance, a routing rule may be carried to the VPN client 206 that states that all traffic to a (cloud) service A 234 needs to be routed over an SD-WAN VPN, for example, VPN 13. It may also state that another (cloud) service B 220 is reachable bypassing the SD-WAN altogether. In such cases, the flows treated this way may only carry proof that the VPN client 206 handled traffic. Lastly, the routing policy may indicate how to dispose of unclassified traffic (i.e., the equivalent of a default route). The proof-of-transit can be added or encoded in an HTTP transport layer security (TLS) session managed over TCP by individual components (routers, nodes, services, etc.) along the path.

Even though only two messages are shown for downloading routes into a VPN client 206, it is to be understood that the VPN client 206 can be dynamically and constantly updated with newer version of the routing table, should the enterprise wish to install new routing rules in the (mobile) device's VPN client 206. For instance, examples can include one where the employee moves from "gold" to "bronze" status or the routing rules for an entire class of employees changes. Installation of the routes by the VPN client 206 is depicted through step [7].

The authorization procedure is discussed next. The authorization procedure is used to provide the service provider with the description of the path a flow between the client 204 and the service provider 234 needs to traverse to be authorized. For this purpose, when a client 204 tries to access the service 234, the service provider 234 needs to retrieve a path authorization assertion for the client 204. This path authorization is encoded, in one example, in the (web) credentials by way of security assertions, e.g., coded by way of the SAML (Security Assertion Markup Language) standard. These assertions are made a part of the (web) credentials and are signed by the enterprise's identity provider 226 and are offered to the service provider 234 as part of the HTTP (or other) interaction between the client 204 and the (cloud) service 234. The procedure is depicted in FIGS. 3A and 3B through messages [8]-[25].

In message [8], the client 204 issues an (exemplary) HTTP request for resource X and when the request arrives at the VPN client 206, the VPN client 206 determines how to route the incoming flow. The VPN client 206 uses the routing table obtained through procedure [7] and determines that, in this case, the flow needs to be routed across the SD-WAN to the remote (cloud) service 234. In messages [8]-[11], the incoming requests are forwarded over the SD-WAN and delivered by (virtual) router B 212 to the (cloud) service 234. It is noted that even though a single message is shown, sending HTTP over TLS over TCP requires a series of IP packets to be sent to get to this stage and the routing decision is made on the first TCP SYN packet sent from client 204 to the (cloud) service 234.

On receipt of the HTTP request by the (cloud) service 234, the service provider 234 finds, in this example, that no (web) credentials are carried; e.g., the secure web-cookie is missing. As shown with messages [12]-[15], the client 204 is redirected to the (exemplary) single-sign-on identity provider 226 of the enterprise. The client 204 reformulates the HTTP request and with message [16] requests the identity provider 226 to include the security statement to be formulated in SAML inside the (web) credential. Again, the VPN client 206 determines the disposition for the new flow, now targeting the identity provider 226 (single-sign-on service). This may or may not be the same route as before. Messages [17]-[18] show the delivery of those packets with the identity provider 226. In this example, only a single (virtual) router 210 is needed to reach the identity provider 226.

Messages [19] and [20] optionally involve employee authentication for the system. This may use a simple user-id/password or can be as elaborate as a multi-factor authentication procedure. Then, with message [21], the authentication service 228 is used to finally establish the authenticity of the employee for the enterprise.

Messages [22]-[23] obtain the routing policy for the (now authenticated) employee. The policy service 230 is informed of the requested service, i.e., access a resource in the (cloud) service 234, and the policy service 230 returns in a message the precise requirements for getting such service. This process can include a description of the way-points, in-line services and routing needed for the flow at hand. As shown in step [24], the SAML assertion is built and signed by identity provider 226. This SAML assertion is built into the (web) credential (e.g., secure web-cookie). Message [25] informs the client 204 of the now authorized web-call, with the needed (web) credentials.

A path authorization assertion contains the list of way-points, in-line services and/or routers A, B, etc. The way-points are provided with their own certificates out of band. The path signature procedure is described next. A path signature is performed by the way-points, in-line services and/or routers A, B, etc., when traversed by the (HTTP) flow. Each entity in the path between the client 204 and the service provider 234 can observe the encrypted communication. In particular, each entity can observe TLS/SSL content records containing the encrypted data. For each TLS/SSL record (or a set of them), the way-point, in-line service, and/or router performs a path signature as follows.

Message [26] represents the HTTP request for resource X. This request now carries the SAML assertion (used to indicate the way-points), in-line services and/or routers that need to sign records in the TLS session as described in U.S. Pat. No. 9,426,176, incorporated herein by reference. U.S. Pat. No. 9,426,176 describes the dynamic insertion of a new TLS (or SSL) record type in the TLS stream transparently. The basic idea is that by injecting such records transparently, middle boxes can augment the session with information about the network. In this disclosure, these records are used to assert the network path a flow took. This means that TCP sequence and acknowledgement numbers need to be dynamically managed to allow the new records to be included. These records can be included by any way-point, in-line service and/or service in the chain. While it is described that a TLS record is used to carry signatures, these can also be carried in IP header extensions.

When the VPN client 206 receives the initial TCP message, it selects an egress route and injects the stream into the IPsec or TLS tunnel maintained between the VPN client 206 and the SD-WAN overlay. Messages [27] and [28] show the forwarding of the HTTP request across the SD-WAN. Both router A and B 210, 212 add their respective signature over the hash of the packet. Finally, in message [29], the message is forwarded to the web service 234.

To generate a signature, the mechanism described below may be used. However, other means to generate digital signatures can be used as well. A node computes a hash of the observed TLS/SSL records RECS: H(RECS). The node encrypts the hash result using its private key and stores the result Sig(RECS) in a new path signature TLS record together with a reference of the node and a reference to the set of content records RECS (as described in U.S. Pat. No. 9,426,176). The node can inject the newly created record in the flow. Alternatively, the signed crumbs are transmitted to an external database.

The path verification procedure is further discussed. When the HTTP request finally is dispatched to the service provider 234, it is up to the service provider 234 to accept or reject the incoming flow. The service provider 234 that receives a flow from the client 204 will receive a sequence of content TLS records interleaved with path signature TLS records or will have a means to pull the "crumbs" from the external database.

For each signature TLS record or externally stored crumb, the service provider 234 performs one or more of the following steps: (1) Collect the content records RECS the signature refers to and compute a hash of such records H(RECS); (2) Decrypt the signature Sig(RECS) with the node's public key as found in the path authorization assertion; (3) Verify that the result of the decryption corresponds to the previously computed hash H(RECS). If yes, then the records RECS are guaranteed to have traversed the node; (4) If each content record is signed correctly by each node in the list present in the path authorization assertion, then the service provider 234 authorizes the flow, or otherwise rejects the flow. Typically, authorizing the flow results in granting access to the service.

Figure 4:
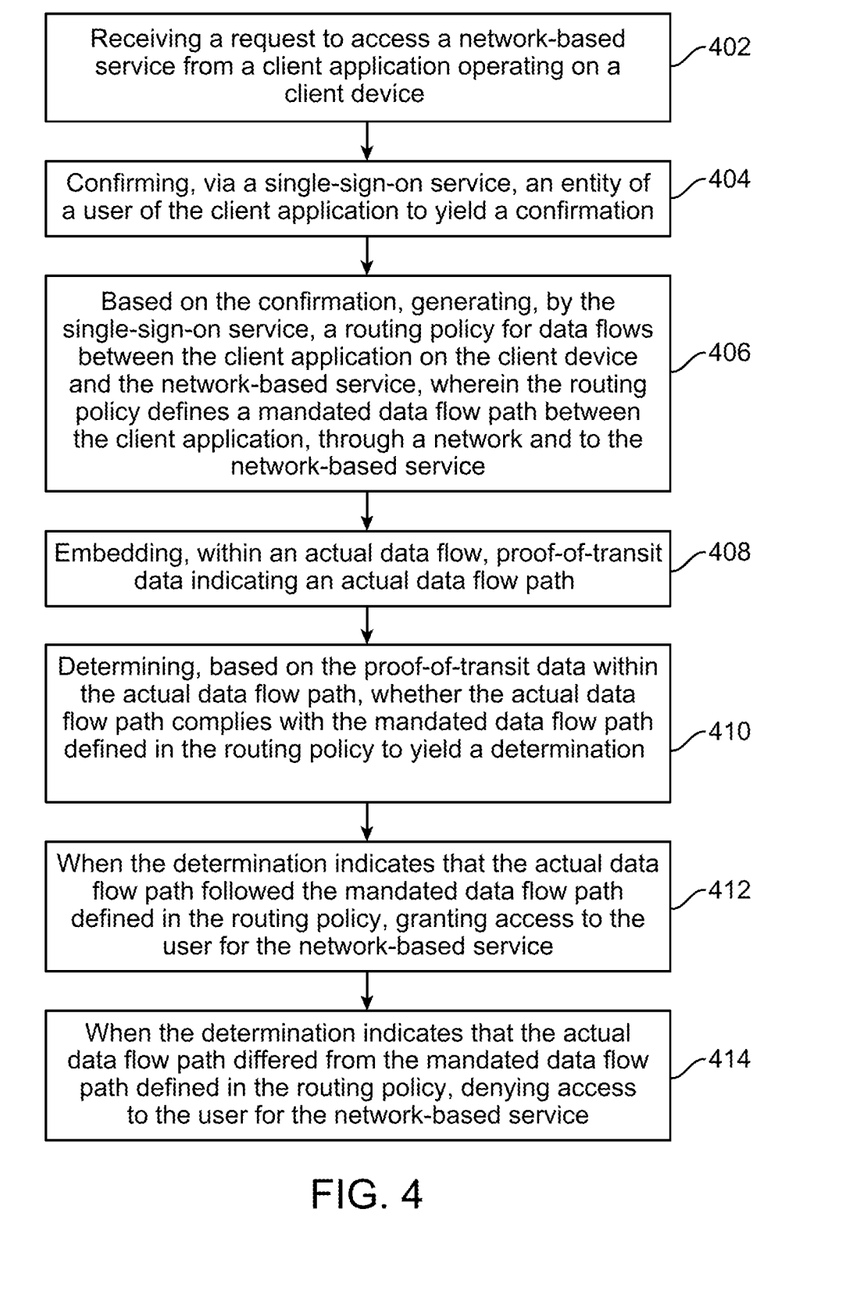
FIG. 4 illustrates another method embodiment.

FIG. 4 illustrates an example method according to an aspect of this disclosure. A method includes one or more of the following steps: receiving a request to access a network-based service from a client application operating on a client device (402), confirming, via a single-sign-on or other authentication service, an entity of a user of the client application to yield a confirmation (404), based on the confirmation, generating, by the single-sign-on or other authentication service, a routing policy for data flows between the client application on the client device and the network-based service, wherein the routing policy defines a mandated data flow path between the client application, through a network and to the network-based service (406), embedding, within an actual data flow, proof-of-transit data indicating an actual data flow path (408) and determining, based on the proof-of-transit data within the actual data flow path, whether the actual data flow path complies with the mandated data flow path defined in the routing policy to yield a determination (410). The embedding, within the actual data flow, of the proof-of-transit data can further include embedding the proof-of-transit in a TCP session which can be later accessed using a key or data received from cookie or token transmitted in a hypertext transfer protocol component inside a transport layer security session. The embedding of the proof-of-transit in the TCP session can also performed at each hop along the actual data flow. In another aspect, the method does not embed the data about the actual flow in the path but communicates with a separate database to report that pathway taken by the flow. The service provider then, before accepting the flow, can confirm via accessing the external database whether the actual flow conformed to the mandated flow.

When the determination indicates that the actual data flow path followed the mandated data flow path defined in the routing policy, the method includes granting access to the user for the network-based service (412) and, when the determination indicates that the actual data flow path differed from the mandated data flow path defined in the routing policy, denying access to the user for the network-based service (414).

The network-based policy is dynamic and can vary or change based on any number of factors such as according to one or more of service level agreements, machine learning algorithm data, predictive algorithms, time of day, cost of energy, network traffic flow or congestion, manual data, type of service accessed, and so forth.

The routing policy can be applied to the user according to a user credential. Generating the routing policy further can include selecting the routing policy from a plurality of routing policies according to a characteristic of the user. The routing policy can include one of a first routing policy of not verifying the data flow and a second routing policy in which the data flow is verified and tracked from node to node between the client application 204 and the network-based service 234. The routing policy further can include establishing a TLS session which provides proof to the network-based service 234 that the actual data flow path complied with the routing policy.

In another aspect, in some scenarios, such as when contacting the SSO service for the first time, a cookie will be absent. Even in this case, in-line services can still provide for crumbs and provide path data for packets transmitted from the client device to the SSO service. Thus, in the initial communication with an SSO service, the in-line services can provide the SSO service with data on the data path taken to access the SSO service itself. Depending on the path data, the SSO service may deny generating the cookie when the data path is not a desired path. A corrective path could be requested and if complied with, the SSO service may then generate the necessary cookie for accessing the web-service.

A credential associated with the user of the client application can be applied to an application service session which enables the client application 204 to access the network-based service 234 through the secure data flow path. The secure data flow path, in one example, uses one or more of a way-point, an in-line service, a router, and a network node.

A single-sign on or other authentication service can enforce the routing policy for the data flowing between the client application 204 and the network-based service 234. An entity 220 associated with the user can dynamically set the routing policy on a per user basis and/or user device basis for enabling data flow between client applications 204 operated by employees of the entity and the network-based service 234. The policy can be on a per use basis as well, or each time a service is accessed. Machine learning data associated with data flows from a plurality of users of client applications accessing services can be used to dynamically select the routing policy for the user.

The routing policy can, in one example, be based on a priority associated with the user, a user service level agreement, a user group or department, and/or a geographic location of the user. The routing policy can change or be dynamic between a route for an initial access to an SSO service and a second mandated path for accessing a destination service. Thus, a client device, an application or a user can be required to access an SSO service via a first path (or group of authorized paths) and then be assigned a more specific route for the communication with the destination service.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any types of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options) where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

In summary, a method is provided for associating application/service (web) credentials (cookies, OAuth, SAML) with a network path taken for a (HTTP) flow. Overlay or regular routers sign TLS-encapsulated (web or other) traffic and transparently insert records in TLS streams or store these crumbs externally. These signatures are then compared to security assertions captured in the (web or other) credentials, enabling the service to accept or deny an application call given the path a flow took across the network. New functions are provided that reside in the chain for signing the flows, the single-sign-on service to set SAML policy and the cloud service to accept or deny calls.

The approaches disclosed herein enable a service provider 234 (say, a web-server) to verify what network path was taken for flows arriving at the service. This mechanism is useful to make certain network flows are routed through, for example, an optional VPN client 206 and an optional SD-WAN routing system, possibly with zero, one or more services in a verifiable way. The path to be taken is defined by policy and can be implemented by an enterprise's single-sign-on service. One benefit of this approach is that an enterprise can enforce employee traffic to be routed through a cloud-based security perimeter, potentially offered as a service, while still enabling direct communication between (mobile) devices and services.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A method comprising:
generating a routing policy for data flows between a client application on a client device and a network-based service, wherein the routing policy defines a mandated data flow path between the client application, through a network and to the network-based service for a data flow and comprises one of a first routing policy of not verifying the data flow and a second routing policy in which the data flow is verified and tracked from node to node between the client application and the network-based service;
determining whether the actual data flow path for a data flow between the client application and the network-based service complies with the mandated data flow path defined in the routing policy;
granting, in response to a positive result of the determining, access to a user for the network-based service; and
denying, in response to a positive result of the determining, access to the user for the network-based service.

2. The method of claim 1, wherein the routing policy is dynamic.

3. The method of claim 1, wherein the routing policy is applied to the user according to a user credential.

4. The method of claim 1, wherein generating the routing policy further comprises:
selecting the routing policy from a plurality of routing policies according to a characteristic of the user.

5. The method of claim 1, wherein a credential associated with the user of the client application is applied to an application service session which enables the client application to access the network-based service through the mandated data flow path.

6. The method of claim 1, wherein the mandated data flow path comprises using one or more of a way-point, an in-line service, a router, and a network node.

7. A system comprising:
a processor; and
a non-transitory computer-readable media storing instructions which, when executed by the processor, cause the processor to perform operations comprising:
generating a routing policy for data flows between a client application on a client device and a network-based service, wherein the routing policy defines a mandated data flow path between the client application, through a network and to the network-based service for a data flow and comprises one of a first routing policy of not verifying the data flow and a second routing policy in which the data flow is verified and tracked from node to node between the client application and the network-based service;
determining whether the actual data flow path for a data flow between the client application and the network-based service complies with the mandated data flow path defined in the routing policy;
granting, in response to a positive result of the determining, access to a user for the network-based service; and
denying, in response to a positive result of the determining, access to the user for the network-based service.

8. The system of claim 7, wherein the routing policy is dynamic.

9. The system of claim 7, wherein the routing policy is applied to the user according to a user credential.

10. The system of claim 7, wherein generating the routing policy further comprises:
selecting the routing policy from a plurality of routing policies according to a characteristic of the user.

11. The system of claim 7, wherein a credential associated with the user of the client application is applied to an application service session which enables the client application to access the network-based service through the mandated data flow path.

12. The system of claim 7, wherein the mandated data flow path comprises using one or more of a way-point, an in-line service, a router, and a network node.

13. A non-transitory computer-readable media storing instructions which, when executed by a system cause the system to perform operations comprising:
generating a routing policy for data flows between a client application on a client device and a network-based service, wherein the routing policy defines a mandated data flow path between the client application, through a network and to the network-based service for a data flow and comprises one of a first routing policy of not verifying the data flow and a second routing policy in which the data flow is verified and tracked from node to node between the client application and the network-based service;
determining whether the actual data flow path for a data flow between the client application and the network-based service complies with the mandated data flow path defined in the routing policy;
granting, in response to a positive result of the determining, access to a user for the network-based service; and
denying, in response to a positive result of the determining, access to the user for the network-based service.

14. The media of claim 13, wherein the routing policy is dynamic.

15. The media of claim 13, wherein the routing policy is applied to the user according to a user credential.

16. The media of claim 13, wherein generating the routing policy further comprises:
selecting the routing policy from a plurality of routing policies according to a characteristic of the user.

17. The media of claim 13, wherein a credential associated with the user of the client application is applied to an application service session which enables the client application to access the network-based service through the mandated data flow path.

18. The method of claim 1, wherein proof-of-transit data is embedded in the data flow and the proof-of-transit data is used in the determining.

19. The system of claim 7, wherein proof-of-transit data is embedded in the data flow and the proof-of-transit data is used in the determining.

20. The media of claim 13, wherein proof-of-transit data is embedded in the data flow and the proof-of-transit data is used in the determining.

* * * * *